United States Patent [19]

Peter et al.

[11] 3,860,572

[45] Jan. 14, 1975

[54] DISPERSE AZO DYESTUFFS CONTAINING THE RESIDUE OF AN ARYL MONOESTER OF AN ALIPHATIC DICARBOXYLIC ACID

[75] Inventors: Richard Peter; Hans-Joerg Angliker, both of Basel, Switzerland

[73] Assignee: Ciba-Geigy AG, Basel, Switzerland

[22] Filed: July 7, 1971

[21] Appl. No.: 160,565

[30] Foreign Application Priority Data
July 24, 1970 Switzerland.................. 11294/70

[52] U.S. Cl................ 260/207, 8/41 A, 260/152, 260/155, 260/156, 260/157, 260/158, 260/162, 260/207.1, 260/465 D, 260/479 R
[51] Int. Cl.... C09b 29/00, C09b 29/26, D06p 3/72
[58] Field of Search ........ 260/158, 207.1, 207, 152, 260/157, 162, 155

[56] References Cited
FOREIGN PATENTS OR APPLICATIONS
961,412  6/1964  Great Britain.................. 260/207.1

Primary Examiner—Floyd D. Higel
Attorney, Agent, or Firm—Joseph G. Kolodny; Edward McC. Roberts; Prabodh I. Almaula

[57] ABSTRACT

Polyester fibers can be dyed in fast shades by disperse azo compounds of the formula

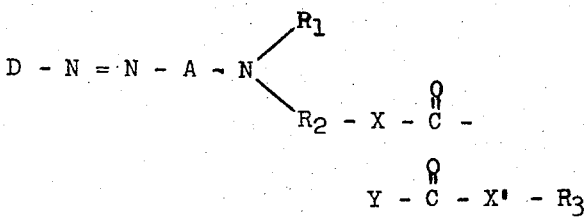

where
D is an aromatic or heterocyclic diazo residue
A is a 1,4-phenylene residue
$R_1$ is lower alkyl which may be substituted or $R_1$ can be

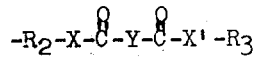

$R_2$ is alkylene
X and X' are —NH—, —S— or —O—
Y is preferably alkylene and
$R_3$ is a phenyl residue.

The dyeings are fast to thermofixing, sublimation, pleating, exhaust gases, overdyeing, dry cleaning, chlorine, water, washing and perspiration.

5 Claims, No Drawings

DISPERSE AZO DYESTUFFS CONTAINING THE RESIDUE OF AN ARYL MONOESTER OF AN ALIPHATIC DICARBOXYLIC ACID

The subject of the invention are new, valuable azo compounds free of sulphonic acid groups, of the formula $$D-N=N-A-N\begin{matrix}R_1\\ \diagdown\\ R_2-X-CO-Y-CO-X'-R_3\end{matrix}$$

wherein D is the radical of a diazo component, A is an optionally substituted 1,4-phenylene radical, $R_2$ is an optionally substituted alkylene radical, X is an imino group, a sulphur atom or preferably an oxygen atom, Y is an optionally substituted aliphatic hydrocarbon radical, X' is an imino group, a sulphur atom or preferably an oxygen atom, $R_1$ is an optionally substituted alkyl radical and $R_3$ is an aryl radical.

Advantageously Y is alkylene of one to seven carbon atoms or a group of the formula $$-\underset{|}{\overset{H}{C}}=\underset{|}{\overset{H}{C}}-,\ -\underset{|}{\overset{CH_2}{\overset{\|}{C}}}-CH_2-\ \text{or}\ -HC=CHCH=CH-;$$

$R_1$ is alkyl of one to five carbon atoms or alkyl of one to five carbon atoms substituted by chloro, fluror, fluoro, cyano, hydroxy, methoxy, ethoxy, phenoxy, carbo-(methoxy, ethoxy or propoxy), carboxyl, formylamino, acetylamino, $C_1$–$C_4$ alkanoyloxy, phenylsulfonyl, p-toluenesulfonyl, methylcarbamyloxy, phenylcarbamyloxy, (methoxy, ethoxy or isopropoxy)-carbonyloxy, nitrophenoxy, hydroxyphenoxy, acetylethoxycarbonyl, (cyano, hydroxy, methoxy or acetoxy)-ethoxycarbonyl, acetyl, cyanoethoxy or ethylureido, or $R_1$ is the group $$-R_2-X-\overset{O}{\overset{\|}{C}}-Y-\overset{O}{\overset{\|}{C}}-X'-R_3,$$

$R_2$ is alkylene of up to eight carbon atoms, and $R_3$ is phenyl or phenyl substituted by Cl, $OCH_3$, Br, $CH_3$, $C_2H_5$, $CF_3$ and $-NHCOCH_3$.

According to the invention, the compounds are obtained by (a) coupling a diazonium compound of a diazo component with a coupling component of the formula $$H-A-NR_1-R_2-X-CO-Y-CO-X'-R_3$$

wherein A, $R_1$, $R_2$, $R_3$, X, X' and Y have the same meaning as above, or (b) condensing azo compounds of the formula $$D-N=N-A-N\begin{matrix}R_1\\ \diagdown\\ R_2-X-H\end{matrix}$$

wherein D, A and $R_2$ have the same meaning as above and $R_1$ is an optionally substituted alkyl group or a radical of the formula $$-R_2-X-H$$

with monohalides of the formula $$Z-CO-Y-CO-X'-R_3$$

wherein Y, X' and $R_3$ have the same meaning as above and Z is a halogen atom, preferably a chlorine atom, and optionally subsequently (c) treating the dyestuffs with quaternising agents.

The compounds, free of acid groups, of the formulae $$D-N=N-A-N\begin{matrix}R_1\\ \diagdown\\ (CH_2)_{\overline{1-3}}-X-\underset{\overset{\|}{O}}{C}-Y-\underset{\overset{\|}{O}}{C}-X'-R'_3\end{matrix}$$

and $$D-N=N-A-N\left[-(CH_2)_{\overline{1-3}}-X-\underset{\overset{\|}{O}}{C}-Y-\underset{\overset{\|}{O}}{C}-X'-R'_3\right]_2$$

wherein D, A, X, X', $R_1$ and Y have the same meaning as above and $R'_3$ is an alkyl group, are of interest. The compounds of the formulae $$D-N=N-A-N\begin{matrix}R_1\\ \diagdown\\ (CH_2)_{\overline{1-3}}-O-\underset{\overset{\|}{O}}{C}-Y-\underset{\overset{\|}{O}}{C}-O-R'_3\end{matrix}$$

and $$D-N=N-A-N\left[-(CH_2)_{\overline{1-3}}-O-\underset{\overset{\|}{O}}{C}-Y-\underset{\overset{\|}{O}}{C}-O-R'_3\right]_2$$

wherein D, A, $R_1$, $R'_3$ and Y have the same meaning as above, are particularly preferred.

The group A advantageously corresponds to the formula

<br>
(benzene ring with substituent $d$ at one position and $c$ at another)

wherein $c$ is in the ortho-position to the azo group and $d$ is in the ortho-position to the amino group.

The radicals $c$ and $d$ represent hydrogen atoms, chlorine atoms, lower alkyl or alkoxy radicals, such as the methyl, ethyl, methoxy or ethoxy radical, and also phenylthio or phenoxy radicals.

The radical $c$ can additionally also represent a bromine atom, a trifluoromethyl group and an acylamino group which is optionally alkylated, preferably methylated, at the nitrogen atom, and in which the acyl radical is the radical of a carboxylic acid, such as a formyl, acetyl, propionyl, butyryl or benzoyl radical, the radical of an organic monosulphonic acid, such as methanesulphonic, ethanesulphonic or p-toluenemonosulphonic acid radical, or the radical of a carbonic acid monoester or monoamide, such as a methoxycarbonyl, phenoxycarbonyl, aminocarbonyl or butylaminocarbonyl radical.

The group $R_1$ can represent a hydrogen atom, an alkyl group or a substituted alkyl group. As examples of a substituted alkyl group there may be mentioned: the β-chloroethyl, β,β,β-trifluoroethyl, β,γ-dichloropropyl, phenylalkyl, such as benzyl or β-phenylethyl, β-cyanoethyl, alkoxyalkyl, such as β-ethoxyethyl or δ-methoxybutyl, hydroxyalkyl, such as β-hydroxyethyl or β,γ-dihydroxypropyl, aryloxyalkyl, such as phenoxybutyl, carbalkoxy, such as β-carbo-(methoxy, ethoxy or propoxy)-ethyl (wherein the terminal alkyl group can carry nitrile, carbalkoxy, acyloxy and alkoxy groups in the ω'-position), β- or γ-carbo(methoxy or ethoxy)-propyl, carboxylic acid, acylaminoalkyl, such as β-(acetyl or formyl)-aminoethyl, fatty acid acyloxyalkyl, such as β-formyloxyethyl, β-acetyloxyethyl, β,γ-diacetoxypropyl, or γ-butyryloxy-propyl, β-arylsulphonylalkyl, such as β-phenylsulphonylethyl, β-(p-toluenesulphonyl)-ethyl or β-(p-chlorobenzenesulphonyl)-ethyl, β-(p-toluenesulphonyl)-ethyl, alkyl- or arylcarbamoyloxyalkyl, such as β-methylcarbamyloxyethyl and β-phenylcarbamyloxyethyl, alkyloxycarbonylalkyl, such as β-(methoxy, ethoxy or isopropoxy)-carbonyloxyethyl, γ-acetamidopropyl, β-(p-nitrophenoxy)-ethyl, β-(p-hydroxyphenoxy)-ethyl, β-(β'-acetylethoxycarbonyl)-ethyl, β-[(β'-cyano, hydroxy, methoxy or acetoxy)-ethoxycarbonyl]-ethyl, β-carboxyethyl, β-acetylethyl, β-diethyl-aminoethyl, β-cyanoacetoxyethyl, β-benzoyl and β-(p-alkoxy- or phenoxy-benzoyl)-oxyethyl groups. The groups $R_1$ and $R_2$ in general contain not more than eight, preferably not more than five, carbon atoms.

As examples of alkylene radicals $R_2$, the following may be mentioned (the terminal amino group of the azo dyestuff also being shown, in order to characterise the position):

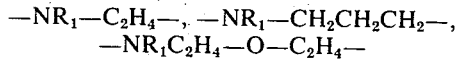

and

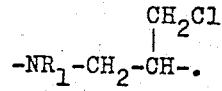

The diazo radical D is principally derived from monocyclic or bicyclic amines of the formula $$D-NH_2$$

such as any diazotisable amines which contain no acid substitutents which confer solubility in water, but especially of amines which possess a heterocyclic five-membered ring with two or three hetero-atoms, above all one nitrogen atom and one or two sulphur, oxygen or nitrogen atoms as hetero-atoms, and aminobenzenes, above all negatively substituted aminobenzenes, especially those of the formula

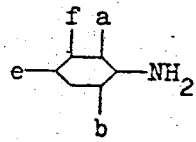

wherein a denotes a hydrogen or halogen atom, or an alkyl or alkoxy, nitro, nitrile, carbalkoxy or alkylsulphone group, b denotes a hydrogen or halogen atom or an alkyl, nitrile or trifluoromethyl group, e denotes a nitro, nitrile, carbalkoxy or alkylsulphonyl group and f denotes a hydrogen or halogen atom or a carbalkoxy or carboxylic acid amide group.

As examples there may be mentioned: 2-aminothiazole, 2-amino-5-nitrothiazole, 2-amino-5-methylsulphonyl-thiazole, 2-amino-5-cyanothiazole, 2-amino-4-methyl-5-nitrothiazole, 3-amino-2,1-benzthiazole, 3-amino-5-chloro-2,1-benzthiazole, 3-amino-5-chloro-7-bromo-2,1-benzisothiazole, 3-amino-5-nitro-2,1-benzisothiazole, 3-amino-5-nitro-7-chloro-2,1-benzisothiazole, 3-amino-5-nitro-7-bromo-2,1-benzisothiazole, 3-amino-6-methyl-2,1-benzisothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl, ethyl, phenyl or benzyl)1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanatobenzthiazole, 2-amino-6-nitrobenzthiazole, 2-amino-6-carboethoxybenzthiazole, 2-amino-(4- or 6)-methylsulphonylbenzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl-1,3,4-thiadiazole, 2-amino-3-nitro-5-methylsulphonyl-thiophene, 2-amino-3,5-bis-(methylsulphonyl)-thiophene, 5-amino-3-methyl-isothiazole, 2-amino-4-cyano-pyrazole, 2-(4'-nitrophenyl)-3-amino-4-cyanopyrazole, 3- or 4-aminophthalimide, aminobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carboethoxybenzene, 1-amino-2-chloro-4-methylsulphonylbenzene, 1amino-2-methylsulphonyl-4-chlorobenzene, 1-amino-2,4-dinitro-6-methylsulphonylbenzene, 1-amino-2,4-dinitro-6-(2'-hydroxyethylsulphonyl)-benzene, 1-amino-2,4-dinitro-6-(2'-chloroethylsulphonyl)-benzene, 1-amino-2-methylsulphonyl-4-nitrobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 4-amino-benzoic acid cyclohexyl ester, 1-amino-2,4-dinitro-6-chlorobenzene and especially 1-amino-2-cyano-4-nitrobenzene, and also 1-aminobenzene-2-, -3- or -4-sulphonic acid amides, such as the N-methlamide or N,N-dimethylamide or N,N-diethylamide, N,γ-isopropoxypropyl-2-aminonaphthalene-6-sulphonic acid amide, N,γ-isopropoxypropyl-1-aminobenzene-2-, -3- or -4-sulphonic acid amide, N-isopropyl-1-aminobenzene-2-, -3- or -4-sulphonic acid amide, N,γ-methoxypropyl-1-aminobenzene-2-, -3- or -4-sulphonic acid amide, N,N-bis-(β-hydroxyethyl)-1-aminobenzene-2-, -3- or -4-sulphonic acid amide, 1-amino-4-chlorobenzene-2-sulphonic acid amide, and the N-substituted derivatives, 2-, 3- or 4-aminophenylsulphamate, 2-amino-4-, -5- or -6-methylphenylsulphamate, 2-amino-5-methoxy-phenylsulphamate, 3-amino-6-chlorophenylsulphamate, 3-amino-2,6-dichlorophenylsulphamate, 4-amino-2- or -3-methoxyphenylsulphamate, N,N-dimethyl-2-aminophenylsulphamate, N,N-di-n-butyl-2-aminophenylsulphamate, N,N-dimethyl-2-amino-4-chlorophenylsulphamate, N,n-propyl-3-aminophenylsulphamate, N,N-di-n-butyl-3-aminophenylsulphamate, O-(3-aminophenyl)-N-morpholine-N-sulphonate, O(3-aminophenyl)-N-piperidinesulphonate, N-cyclohexyl-O-(3-aminophenyl)-sulphamate, N(N-methylaniline)-O-(3-aminophenyl)-sulphonate, N,N-diethyl-3-amino-6-methylphenyl-sulphamate, N-ethyleneimine-O-(4-aminophenyl)-sulphonate, N,N-dimethyl-4-aminophenylsulphamate, O-(n-propyl)-O-(3-aminophenyl)-sulphonate, O,β-chloroethyl-O-(2-aminophenyl)-sulphonate, O-benzyl-O-(3-aminophenyl)-sulphonate and O-ethyl-O-(4-amino-2,6-dimethyl-phenyl)-sulphonate, 4-aminoazobenzene, 3,-2'-dimethyl-4-aminoazobenzene, 2-methyl-5-methoxy-4-aminoazobenzene, 4-amino-2-nitroazobenzene, 2,5-dimethoxy-4-aminoazobenzene, 4'-methoxy-4-aminoazobenzene, 2-methyl-4'-methoxy-4-aminoazobenzene, 3,6,4'-trimethoxy-4-aminoazobenzene, 4'-chloro-4-aminoazobenzene, 2'- or 3'-chloro-4-aminoazobenzene, 3-nitro-4-amino-2',4'-dichloroazobenzene and 4-aminoazobenzene-4'-sulphonic acid amide.

Instead of the abovementioned diazo components which are free of ionising groups which confer solubility in water, it is also possible to use diazo components which contain fibre-reactive groups, such as, for example s-triazinyl radicals which carry 1 or 2 fluorine, chlorine or bromine atoms on the triazine ring, pyrimidyl radicals which carry one or two chlorine atoms or fluorine atoms, or one or two arylsulphonyl or alkanesulphonyl groups on the pyrimidine ring, mono- or bis-($\gamma$-halogen-$\beta$-hydroxypropyl)-amino groups, $\beta$-halogenoethylsulphamyl radicals, $\beta$-halogenoethoxy groups, $\beta$-halogenoethylmercapto groups, 2-chloro-benzthiazolyl-6-azo groups, 2-chlorobenzthiazolyl-6-amino groups, $\gamma$-halogeno-$\beta$-hydroxypropylsulphamyl radicals, chloroacetylamino groups, $\alpha,\beta$-dibromopropionyl groups, vinylsulphonyl groups and 2,3-epoxypropyl groups.

Suitable fibre-reactive diazo components are, for example, N,$\beta$-chloroethyl-3-chloro-4-aminobenzenesulphamide (hydrochloride), N,$\beta$-chloroethyl-4-aminobenzene-sulphamide (hydrochloride), 3-bromo-4-amino-$\omega$-chloroacetophenone, N,$\gamma$-chloro-$\beta$-hydroxypropyl-4-aminobenzene-sulphamide, N,$\beta$-chloroethyl-1-amino-4-naphthylsulphonamide, N,$\beta$-chloroethyl-1-amino-3,5-dichloro-benzenesulphamide and 4-($\gamma$-chloro-$\beta$-hydroxypropoxy)aniline.

The diazotisation of the diazo components mentioned can be effected in accordance with the position of the amino group in question, for example by means of mineral acid and sodium nitrite, or, for example, by means of a solution of nitrosylsulphuric acid in concentrated sulphuric acid.

The coupling can also be effected in a manner which is in itself known, for example in a neutral to acid medium, optionally in the presence of sodium acetate or similar buffer substances, or catalysts, which influence the coupling speed, such as, for example, dimethylformamide, pyridine or its salts.

The coupling components are obtained if amines of the formula

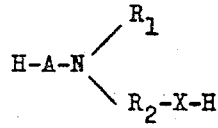

$R_A$, $r_1$, $R_2$ and X have the same meaning as above, are acylated with a monoester or monoamide of a cycloaliphatic carboxylic acid of the formula HOOC—Y—CO—X'—$R_3$.

Suitable aliphatic carboxylic acid monoesters, monothioesters and monoamides are for example derived from the following aliphatic dicarboxylic acids: malonic acid, succinic acid, glutaric acid, adipic acid, pimelic acid, suberic acid, dodecylsuccinic acid, $\alpha,\beta$-diethylsuccinic acid, maleic acid, fumaric acid, ethylbutenylsuccinic acid, itaconic acid, ethylidenemalonic acid and muconic acid.

Amines of the formula

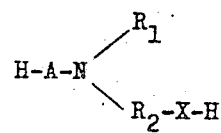

which can be used to manufacture the coupling component are, for example: N,n-butyl-N-$\beta$'-hydroxyethylaniline, N-methyl-N-$\beta$'-hydroxyethylaniline, N-$\beta$-cyanoethyl-N-$\beta$'-hydroxyethylaniline, N,$\beta$-cyanoethyl-N,$\beta$'-hydroxyethyl-3-chloroaniline, N-ethyl-N,$\beta$-hydroxyethyl-2-methoxyaniline, N-ethyl-N,$\beta$'-hydroxyethyl-2-methylaniline, N,$\beta$-cyanoethyl-N,$\beta$'-hydroxyethyl-2-acetylamino-aniline, N,$\beta$-($\beta$'-cyanoethoxyethyl)-N,$\beta$''-hydroxyethyl-aniline, N,$\beta$-cyanoethyl-N,$\beta$'-hydroxyethyl-3-methyl-aniline and N,$\gamma$-methylaminopropyl-N-ethylaniline.

Possible monoesters, monoamides and monothioesters are, for example, the monophenyl and monotolyl esters, the N-phenyl- and N-toluyl-monoamides and the toluylthioesters of the abovementioned aliphatic dicarboxylic acids.

Those of the abovementioned heterocyclic diazo components which possess a quaternisable nitrogen atom can also be coupled oxidatively in the N-alkylated form as hydrazones or as azosulphones (compare Angewandte Chemie, volume 70, 215 (1958); volume 74, 818 (1962); volume 80, 343 (1968)).

Those amongst the new compounds which contain a quaternised amino group can also be obtained by quaternising the corresponding dyestuffs which contain a non-quaternised amino group, by treatment with alkylating agents.

As such alkylating or quaternising agents it is for example possible to use: esters of strong mineral acids, or of organic sulphonic acids, for example, dimethyl sulphate, diethyl sulphate, alkyl halides, for example methyl chloride, bromide or iodide, aralkyl halides, for example benzyl chloride, esters of low molecular alkanesulphonic acids, such as, for example methyl esters of methanesulphonic, ethanesulphonic or butanesulphonic acid, and esters of benzenesulphonic acids, which can possess additional substituents, for example methyl, ethyl, propyl or butyl esters of benzenesulphonic acid, of 2- or 4-methylbenzenesulphonic acid, 4-chlorobenzenesulphonic acid or 3- or 4- nitrobenzenesulphonic acid.

The alkylation is appropriately effected by warming in an inert organic solvent, for example hydrocarbons, such as benzene, toluene or xylene, halogenated hydrocarbons, such as carbon tetrachloride, tetrachloroethane, chlorobenzene or o-dichlorobenzene, or nitrohydrocarbons, such as nitromethane, nitrobenzene or nitronaphthalene. Acid anhydrides, acid amides or nitriles, such as acetic anhydride, dimethylformamide or acetonitrile, or dimethylsulphoxide, can also be used as solvents in the alkylation. Instead of a solvent, a large excess of alkylating agent can also be used. In this case, admittedly, care must be taken that the mixture does not become excessively hot, since the reaction is strongly exothermic. Nevertheless it is necessary in most cases, especially in the presence of organic solvents, to warm the reaction mixture externally in order to start the reaction. In special cases the alkylation can also be carried out in an aqueous medium or using an alcohol, optionally in the presence of small amounts of potassium iodide.

If purification of the salts is necessary, it is appropriately effected by dissolving in water, in which case any unreacted starting dyestuff can be filtered off as an insoluble residue. The dyestuff can again be separated out from the aqueous solution by adding water-soluble salts, for example sodium chloride.

The non-quaternished dyestuffs are as a rule insoluble in water.

The new compounds, their mixtures with one another and their mixtures with other azo dyestuffs are outstandingly suitable for dyeing and printing leather, wool, silk and above all synthetic fibres, such as, for example, acrylic or acrylonitrile fibres, polyacrylonitrile fibres and copolymers of acrylonitrile and other vinyl compounds, such as acrylic esters, acrylamides, vinylpyridine, vinyl chloride or vinylidene chloride, copolymers of dicyanoethylene and vinyl acetate as well as acrylonitrile block copolymers, fibres of polyurethanes, polyolefines, such as basic-modified, nickel-modifed or unmodified polypropylene, cellulose triacetate and cellulose 2½-acetate and especially fibres of polyamides, such as nylon 6, nylon 6,6 or nylon 12, and of aromatic polyesters, such as those from terephthalic acid and ethylene glycol or 1,4-dimethylcyclohexane, and copolymers of terephthalic acid and isophthalic acid and ethylene glycol.

For dyeing in aqueous liquors, the water-insoluble dyestuffs are appropriately used in finely divided form, and dyeing is carried out with addition of dispersing agents, such as sulphite cellulose waste lye or synthetic detergents, or of a combination of different wetting agents and dispersing agents. As a rule it is advisable to convert the dyestuffs to be used, before dyeing, into a dyeing preparation which contains a dispersing agent and finely divided dyestuff in such a form that on dilution of the dyestuff preparations with water a fine dispersion is produced. Such dyestuff preparations can be obtained in a known manner, for example by grinding the dyestuff in a dry or wet form with or without addition of dispersing agents during the grinding process.

In order to achieve intense dyeings on polyethylene terephthalate fibres, it proves advisable to add a swelling agent to the dyebath, or to carry out the dyeing process under pressure at temperatures above 100°C, for example at 120°C. Suitable swelling agents are aromatic carboxylic acids, for example salicylic acid, phenols, such as, for example, o- or p-hydroxydiphenyl, aromatic halogen compounds, such as o-dichlorobenzene, or diphenyl.

For thermofixing the dyestuff, the padded polyester fabric is heated, appropriately after prior drying, for example in a warm stream of air, to temperatures of above 100°C, for example between 180° and 210°C.

The dyeings obtained according to the present process can be subjected to an after-treatment, for example by heating with an aqueous solution of a non-ionic detergent.

Instead of being applied by impregnation, the compounds indicated can, according to the present process, also be applied by printing. For this purpose, for example, a printing ink is used which contains the finely disperse dyestuff in addition to the auxiliaries customary in printing, such as wetting agents and thickeners.

Furthermore, it is possible, for example, to dye in organic solvent liquors, such as a mixture of perchloroethylene and dimethylformamide.

The present process yields strong dyeings and prints of good fastness properties, especially good fastness to thermofixing, sublimation, pleating, exhaust gases, overdyeing, dry cleaning, chlorine and wet treatments, such as fastness to water, washing and perspiration. The very high melting points of the new compounds, which permit easier conditioning as dyestuffs, should also be highlighted.

The new water-insoluble compounds can also be used for spin-dyeing polyamides, polyesters and polyolefines. The polymer to be dyed is appropriately mixed in the form of powder, granules or chips, as a ready-to-use spinning solution or in the fused state, with the dyestuff, which is introduced in the dry state or in the form of a dispersion or solution in a solvent, which may be volatile. After homogeneous distribution of the dyestuff in the solution or melt of the polymer, the mixture is converted into fibres, yarns, monofilaments, films and the like in a known manner, by casting, pressing or extrusion.

In the examples which follow, the parts, unless otherwise state, denote parts by weight and the percentages denote percentages by weight.

EXAMPLE 1

20 parts of succinic anhydride and 60 parts of phenol are heated to 200°C for 4 hours. After cooling, the mixture is taken up in benzene and extracted with sodium carbonate solution. The aqueous phase is rendered acid, whereupon a precipitate forms. The precipitate is filtered off and dried. Succinic acid monophenyl ester is obtained.

16.4 parts of succinic acid monophenyl ester in 20 parts by volume of thionyl chloride, with the addition of 0.2 part by volume of dimethylformamide, are stirred for some time at 35° to 40°C. Thereafter the excess thionyl chloride is removed in vacuo and the residue is distilled in a waterpump vacuum.

4.3 parts of N-bis-(β-hydroxyethyl)-3-chloro-aniline are dissolved in 30 parts by volume of pyridine and treated with a slight excess of succinic acid monophenyl ester monochloride, in the course of which the temperature rises. The mixture is stirred for 5 hours whilst warm, and it is then allowed to cool. The mixture is then taken up in benzene and the benzene solution is washed with water. After removing the solvent, the coupling component of the formula

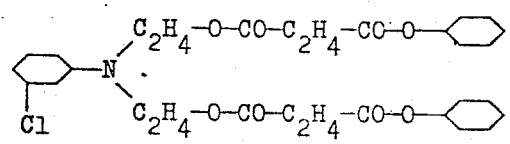

is obtained.

1.63 parts of 2-cyano-4-nitro-aniline are diazotised in 1 N nitrosylsulphuric acid. The diazo solution is added dropwise, at 0°C, to a solution of 5.67 parts of the above coupling component in 100 parts by volume of 80 percent strength acetic acid. After the coupling is complete, the dyestuff is precipitated, washed and dried in vacuo. A product of the formula

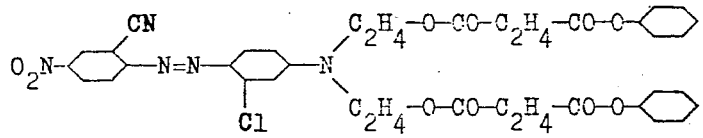

is obtained which dyes polyester in bluish-tinged red shades.

If the diazonium compounds of the diazo components mentioned in column I of the table below are coupled with the coupling components mentioned in column II, dyestuffs are obtained which dye polyester fibres in the shades indicated in column III.

| | I | II | III |
|---|---|---|---|
| 1 | 2-Cyano-4-chloro-aniline | ⟨⟩-N(C₂H₄-CN)(C₂H₄-O-CO-CH₂-CH₂-CO-O-C₆H₅) | golden yellow |
| 2 | 2-Chloro-4-nitro-aniline | ⟨⟩(CH₃)-N(C₂H₄-O-CO-CH₂-CH₂-CO-O-C₆H₅)(C₂H₄-O-CO-CH₂-CH₂-CO-O-C₆H₅) | red |
| 3 | 2-Cyano-4-nitro-aniline | ⟨⟩(CH₃)-N(C₂H₄-O-CO-CH₂-CH₂-CO-O-C₆H₅)(C₂H₄-O-CO-CH₂-CH₂-CO-O-C₆H₅) | ruby |
| 4 | 4-Nitro-aniline | " | reddish-tinged orange |
| 5 | 4-Nitro-aniline | ⟨⟩(Cl)-N(C₂H₄-O-CO-CH₂-CH₂-CO-O-C₆H₅)(C₂H₄-O-CO-CH₂-CH₂-CO-O-C₆H₅) | orange |
| 6 | 2-Chloro-4-nitro-aniline | " | scarlet |
| 7 | 2-Chloro-4-methylsulphonyl-aniline | ⟨⟩-N(C₂H₅)(C₂H₄-O-CO-C₂H₄-CO-O-C₆H₅) | orange-yellow |
| 8 | 2-Trifluoromethyl-4-chloro-aniline | ⟨⟩-N(CH₂-C₆H₅)(C₂H₄-O-CO-C₂H₄-CO-O-⟨⟩-Cl) | yellow |
| 9 | 2,5-Dimethoxy-4-cyano-aniline | ⟨⟩-N(C₂H₄-COOCH₃)(C₂H₄-O-CO-C₂H₄-CO-O-⟨⟩-OCH₃) | orange |

—Continued

| | I | II | III |
|---|---|---|---|
| 10 | 2-Amino-sulphonyl-aniline | C₆H₅–N(C₂H₄–O–CH₃)(C₂H₄–O–CO–C₂H₄–CO–O–C₆H₄–Cl) | yellow |
| 11 | 2-Amino-terephthalic acid dimethyl ester | C₆H₅–N(C₂H₄–O–CO–O–C₂H₅)(C₂H₄–O–CO–C₂H₄–CO–O–C₆H₄–Br) | reddish-tinged yellow |
| 12 | 2,4-Diethoxy-aniline | C₆H₅–N(CH₃)(C₂H₄–O–CO–C₂H₄–CO–O–C₆H₄–OCH₃) | yellow |
| 13 | 4-Methylsulphonyl-aniline | C₆H₅–N(C₂H₄–O–C₂H₄–CN)(C₂H₄–O–CO–C₂H₄–CO–O–C₆H₄–CH₃) | yellow |
| 14 | 2-Cyano-4-nitro-6-bromo-aniline | C₆H₅–N(C₃H₆–NH–CO–NH–C₂H₅)(C₂H₄–O–CO–C₂H₄–CO–O–C₆H₄–CH₃) | violet |
| 15 | 2-Phenoxy-4-nitro-aniline | C₆H₅–N(C₂H₄O–CO–CH₃)(C₂H₄–O–CO–C₂H₄–CO–O–C₆H₄–C₂H₅) | red |
| 16 | 2-Amino-6-acetyl-amino-benzthiazole | C₆H₅–N(C₂H₄–O–CO–CH₂–CH₂–CH₃)(C₂H₄–O–CO–C₂H₄–CO–O–C₆H₅) | red |
| 17 | 2-Cyano-4-chloro-aniline | C₆H₅–N(C₂H₅)(C₂H₄–O–CO–C₂H₄–CO–O–C₆H₄–CF₃) | orange yellow |
| 18 | 2-Amino-6-(β-cyanoethyl)-sulphonyl-benzthiazole | C₆H₄(NH–CO–CH₃)–N(C₂H₅)(C₂H₄–O–CO–C₂H₄–CO–O–C₆H₅) | bluish-tinged red |

-Continued

| | I | II | III |
|---|---|---|---|
| 19 | 2-Cyano-4-chloro-aniline | Cyclohexyl-N($C_2H_4$-O-CO-$C_2H_4$-CO-O-$C_6H_5$)($C_2H_4$-O-CO-$C_2H_4$-CO-O-$C_6H_5$), NH-CO-O$C_2H_5$ | red |
| 20 | 2-Amino-6-(β-cyanoethyl)-mercapto-benzthiazole | Cyclohexyl-N($CH_3$)($C_2H_4$-O-CO-$C_2H_4$-CO-O-$C_6H_5$), NH-CO-NH$CH_3$ | red |
| 21 | 2-Chloro-4-nitro-aniline | Cyclohexyl($CH_3$)-N($C_2H_5$)($C_2H_4$-O-CO-$C_2H_4$-CO-O-$C_6H_5$), NH-CO-$CH_3$ | bluish-tinged red |
| 22 | 3-Amino-5-nitro-6-bromo-benzisothiazole | Cyclohexyl(Cl)-N($C_2H_4$-CN)($C_2H_4$-O-OC-$C_2H_4$-OC-O-$C_6H_5$) | blue |
| 23 | 3-Amino-5-nitro-benzisothiazole | Cyclohexyl(O$CH_3$)-N($C_2H_4$-CN)($C_2H_4$-O-CO-$C_2H_4$-CO-O-$C_6H_5$) | blue |
| 24 | 3-Amino-benzisothiazole | Cyclohexyl-N($C_2H_4$-CN)($C_2H_4$-O-CO-$C_2H_4$-CO-O-$C_6H_5$) | red-violet |
| 25 | 3-Amino-5,7-dibromo-benzisothiazole | Cyclohexyl($CH_3$)(O$CH_3$)-N($C_2H_5$)($C_2H_4$-O-CO-$C_2H_4$-CO-O-$C_6H_5$) | blue |
| 26 | 3-Amino-5-chloro-benzisothiazole | Cyclohexyl-N($C_2H_5$)($C_2H_4$-O-CO-$C_2H_4$-CO-O-$C_6H_5$), NH-CO-$CH_3$ | blue |
| 27 | 3-Amino-5-chloro-7-bromo-benzisothiazole | Cyclohexyl-N($C_2H_4$-CN)($C_2H_4$-O-CO-$C_2H_4$-CO-O-$C_6H_5$) | blue-violet |
| 28 | 2-Amino-5-nitro-thiazole | Cyclohexyl-N($C_2H_5$)($C_2H_4$-O-CO-$C_2H_4$-CO-O-$C_6H_5$) | violet |

— Continued

| | I | II | III |
|---|---|---|---|
| 29 | 3-Phenyl-5-amino-1,2,4-thiadiazole | ⟨⟩-N(C₂H₄-CN)(C₂H₄-O-CO-C₂H₄-CO-O-C₆H₅) | yellowish-tinged red |
| 30 | 2-Cyano-4-nitro-aniline | OCH₃, NH-CO-CH₃ substituted ⟨⟩-N(C₂H₅)(C₂H₄-O-CO-C₂H₄-CO-O-C₆H₅) | violet |
| 31 | 2-Chloro-4-nitro-aniline | ⟨⟩-N(C₂H₄-CN)(C₂H₄-O-CO-C₂H₄-CO-O-⟨⟩-NH-CO-CH₃) | orange |
| 32 | 2-Chloro-4-nitro-aniline | ⟨⟩-N(C₂H₄-CN)(C₂H₄-O-OC-C₂H₄-CO-O-C₆H₅) | orange |
| 33 | 2-Cyano-4-nitro-aniline | ⟨⟩-N(C₂H₄-CN)(C₂H₄-O-CO-C₂H₄-CO-O-C₆H₅) | red |
| 34 | 4-Nitro-aniline | " | golden yellow |
| 35 | 2,6-Dichloro-4-nitro-aniline | " | orange |
| 36 | 2-Amino-5-nitro-benzoic acid methyl ester | " | orange |

Dyeing instruction 1 part of the dyestuff obtained according to Example 1 is ground wet with 2 parts of a 50 percent strength aqueous solution of the sodium salt of dinaphthylmethanedisulphonic acid, and the mixture is dried.

This dyestuff preparation is stirred with 40 parts of a 10 percent strength aqueous solution of the sodium salt of N-benzyl-μ-heptadecyl-benzimidazoledisulphonic acid, and 4 parts of a 40 percent strength acetic acid solution are added. A dyebath of 4,000 parts is prepared therefrom by dilution with water.

100 parts of a cleaned polyester fibre material are introduced into this bath at 50°C, the temperature is raised to 120° – 130°C over the course of half an hour, and dyeing is carried out for one hour in a closed vessel at this temperature. Thereafter the material is well rinsed. A bluish-tinged red dyeing of excellent fastness to light and to sublimation is obtained.

EXAMPLE 2 a. 6 parts of the dyestuff of the formula

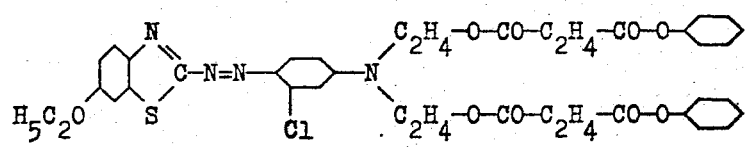

are warmed to 80°C in 100 parts of dimethylformamide and alkylated at this temperature with a slight excess of dimethyl sulphate. Thereafter the dyestuff is precipitated with ethyl acetate and purified by recrystallisation from water. A dyestuff of the formula

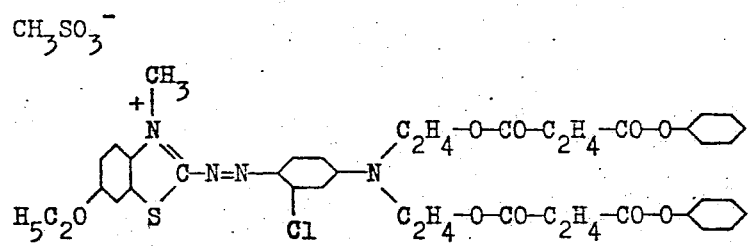

is obtained, which dyes polyacrylonitrile fibres in blue shades.

b. The same dyestuff is obtained if a mixture of 2.3 parts of 2-hydrazino-3-methyl-6-ethoxy-2,3-dihydrobenzthiazole and 5.67 parts of the coupling component mentioned in Example 1, in glacial acetic acid, it is treated with ferric chloride solution.

Diazotisation of the diazo components quoted in column I of the table below, coupling of the diazonium compounds with the coupling components indicated in column II, and subsequent quaternisation with dimethyl sulphate, or oxidative coupling of the corresponding hydrazones with the coupling components, analogously yields dyestuffs which dye polyacrylonitrile in the shades indicated in column III.

| | I | II | III |
|---|---|---|---|
| 1 | | C6H5–N(C2H4–CN)(C2H4–O–CO–C2H4–CO–O–C6H5) | blue |
| 2 | O2N-benzothiazole-NH2 | C6H5–N(C2H5)(C2H4–O–CO–C2H4–CO–O–C6H5) | blue |
| 3 | H2NO2S-benzothiazole-NH2 | C6H5–N(C2H4–O–CH3)(C2H4–O–CO–C2H4–CO–O–C6H5) | blue |
| 4 | C6H5–C=N, N=C–NH2, S (thiadiazole) | C6H5–N(C2H4–CN)(C2H4–O–CO–C2H4–CO–O–C6H4–OCH3) | violet |

-Continued
| | I | II | III |
|---|---|---|---|
| 5 | 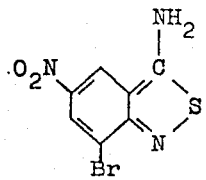 | 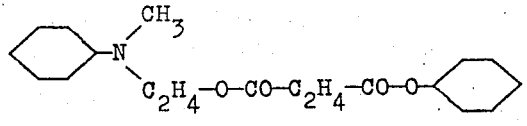 | blue |
| 6 | 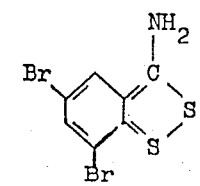 | 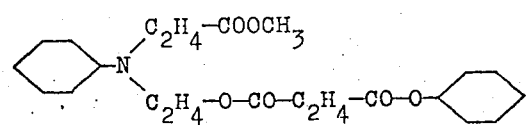 | violet |
| 7 | 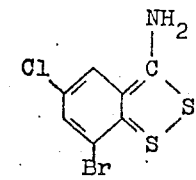 | 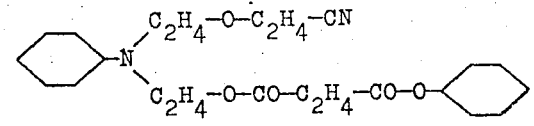 | violet |
| 8 | 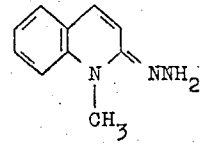 | 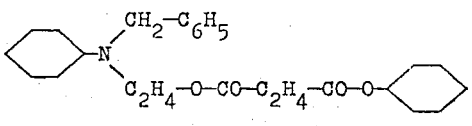 | blue-violet |
| 9 | 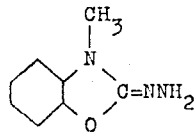 | 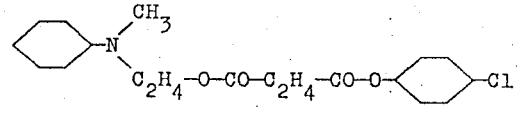 | violet |
| 10 | 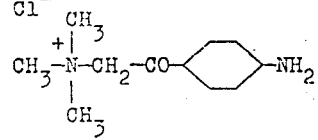<br>(only diazotisation and coupling) | 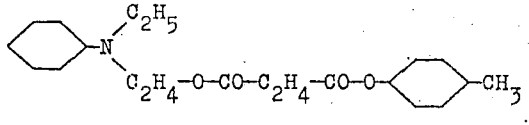 | orange-yellow |
| 11 | 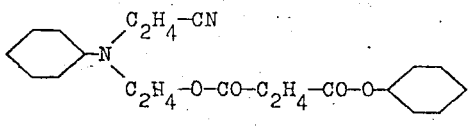 | | red |

—Continued

| | I | II | III |
|---|---|---|---|
| 12 | (structure: cyclohexane-fused imidazole with C-NH₂, N-CH₃) | (structure: cyclohexyl-N(C₂H₅)(C₂H₄-O-CO-C₂H₄-CO-O-cyclohexyl)) | bluish-tinged red |
| 13 | (structure: pyridyl-thiadiazole with C-NH₂) | (structure: cyclohexyl-N(C₂H₅)(C₂H₄-O-CO-C₂H₄-CO-O-cyclohexyl)) | red |
| 14 | (structure: triazole with C-NH₂, N-CH₃) | (structure: cyclohexyl-N(C₂H₅)(C₂H₄-O-CO-C₂H₄-CO-O-cyclohexyl)) | red |
| 15 | (structure: C₆H₅-thiadiazole with C-NH₂) | (structure: cyclohexyl-N(CH₃)(C₂H₄-O-CO-C₂H₄-CO-O-cyclohexyl)) | violet |

EXAMPLE 3

1 part of the dyestuff obtained according to Example 2 is dissolved in 5,000 parts of water, with the addition of 2 parts of 40 percent strength acetic acid. 100 parts of dried polyacrylonitrile staple fibre yarn are introduced into this dyebath at 60°C, the temperature is raised to 100°C over the course of half an hour, and dyeing is carried out for one hour at the boil. The dyeing is then well rinsed and dried. A blue dyeing having very good fastness to light, sublimation and washing is obtained.

We claim:

1. An azo compound free of sulphonic acid groups of the formula

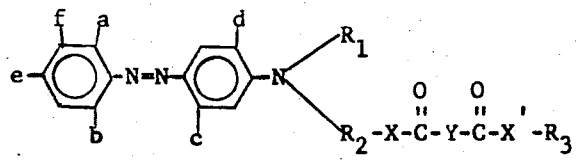

wherein
   $a$ is hydrogen, chloro, bromo, methoxy, ethoxy, nitro, nitrile, carbomethoxy, methylsulfonyl or phenoxy,
   $b$ is hydrogen, chloro, bromo, nitrile, trifluoromethyl, methoxy or ethoxy,
   $c$ and $d$ are each hydrogen, chloro, lower alkyl, lower alkoxy, phenylthio or phenoxy and $c$ additionally can be bromo, trifluoromethyl, formylamino, acetylamino, propionylamino, butyrylamino, benzoylamino, methane-or ethane sulfonyl, P-toluenesulfonyl, methoxycarbonyl, phenoxycarbonyl, aminocarbonyl, or butylaminocarbonyl,
   $e$ is nitro, nitrile, carbethoxy or methylsulfonyl,
   $f$ is hydrogen or methoxy,
   X is —NH—, —S— or —O—,
   Y is alkylene of one to seven carbon atoms or a group of the formula

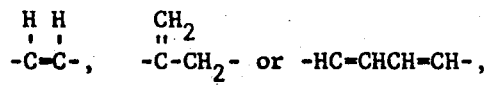

X' is —NH—, —S— or —O—,
   $R_1$ is alkyl of one to five carbon atoms or alkyl of one to five carbon atoms substituted by chloro, fluoro, phenyl, cyano, hydroxy, methoxy, ethoxy, phenoxy, carbo-(methoxy, ethoxy or propoxy), carboxyl, formylamino, acetylamino, $C_1$-$C_4$ alkanoyloxy, phenylsulfonyl, p-toluenesulfonyl, methylcarbamyloxy, phenylcarbamyloxy, (methoxy, ethoxy, or isopropoxy)- carbonyloxy, nitrophenoxy, hydroxyphenoxy, acetylethoxycarbonyl, (cyano, hydroxy, methoxy or acetoxy)-ethoxycarbonyl, acetyl, cyanoethoxy or ethylureido, or $R_1$ is the group $$-R_2-X-\overset{O}{\underset{\|}{C}}-Y-\overset{O}{\underset{\|}{C}}-X'-R_3,$$

$R_2$ is alkylene of up to eight carbon atoms, and $R_3$ is phenyl or phenyl substituted by Cl, $OCH_3$, Br, $CH_3$, $C_2H_5$, $CF_3$ and $-NHCOCH_3$.

2. A compound according to claim 1, wherein $c$ and $d$ are hydrogen, and $R_2$ is methylene, ethylene or propylene.

3. A compound according to claim 2, wherein $R_1$ is $$R_1 \text{ is } -R_2-X-\overset{O}{\underset{\|}{C}}-Y-\overset{O}{\underset{\|}{C}}-X'-R_3.$$

4. A compound according to claim 2, wherein X is $-O-$.

5. A compound according to claim 3, wherein X is $-O-$.

* * * * *